J. RISBRIDGER.
TROLLEY.
APPLICATION FILED MAY 12, 1911.
1,060,947.
Patented May 6, 1913.
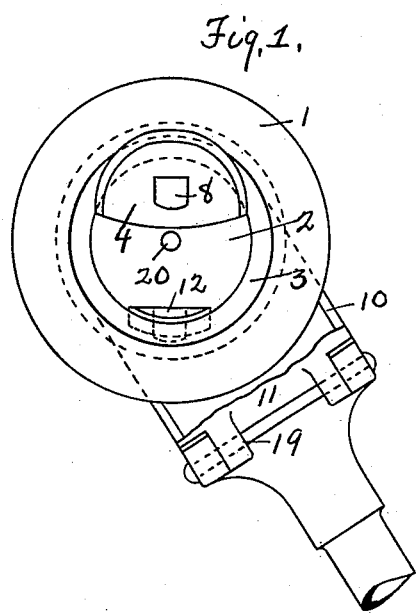
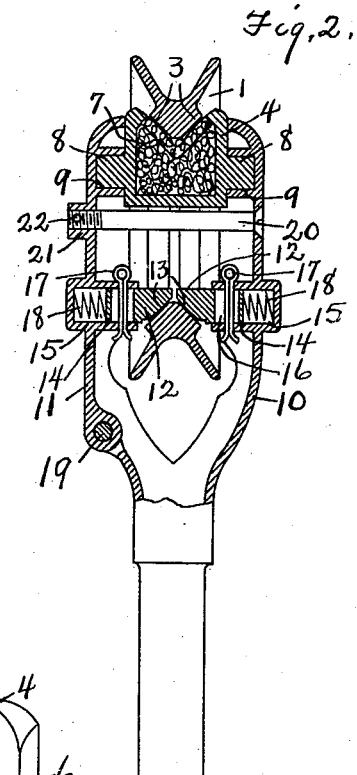
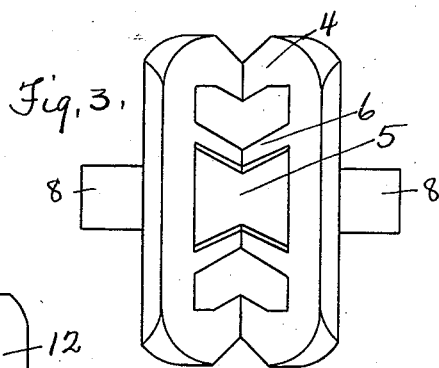
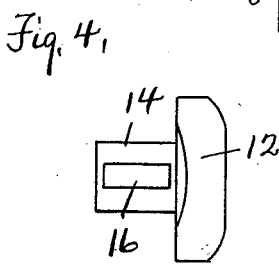
Witnesses
Blanche M. Hartman
Vinnie C. Hess
Inventor
John Risbridger
by H.Z.L.
Attorney

UNITED STATES PATENT OFFICE.

JOHN RISBRIDGER, OF NORTH EAST, PENNSYLVANIA, ASSIGNOR OF FIFTY-FIVE ONE-HUNDREDTHS TO EUREKA TEMPERED COPPER WORKS, OF NORTH EAST, PENNSYLVANIA, A CORPORATION OF PENNSYLVANIA.

TROLLEY.

1,060,947.

Specification of Letters Patent.

Patented May 6, 1913.

Application filed May 12, 1911. Serial No. 626,724.

*To all whom it may concern:*

Be it known that I, JOHN RISBRIDGER, a citizen of the United States, residing at North East, in the county of Erie and State of Pennsylvania, have invented new and useful Improvements in Trolleys, of which the following is a specification.

This invention relates to trolleys and consists in certain improvements in the construction thereof as will be hereinafter fully described and pointed out in the claims.

The leading object of the invention is to provide a trolley wheel with a bearing which will assure its running true and at the same time assure a perfect contact for carrying off the current.

Other objects of the invention will appear from the specification and claims.

The invention is illustrated in the accompanying drawings as follows:

Figure 1 shows a side elevation of a trolley, one side of the harp being removed to better show construction. Fig. 2 shows a central vertical section through the wheel. Fig. 3 a plan view of the bearing block. Fig. 4 a plan view of one of the takeup lugs.

1 marks the trolley wheel. This is in the form of a ring with a large opening 2 surrounded by the beveled or tapered bearing surface 3. The ring rests on the bearing block 4, the bearing block having a surface to conform to the surface 3. The bearing block has preferably a cavity 5 with the bearing bars 6 arranged across it. A felt 7 for retaining lubricant is arranged in the receptacle and carries the lubricant to the bearing surfaces. The bearing block has the lugs 8 which extend each side of the block and these project into sockets 9 in the sides 10 and 11 of the harp. These lugs 8 and sockets 9 are of irregular shape so as to lock the bearing block against turning. The bearing lugs 12 have the beveled surfaces 13 which engage the trolley wheel at the bottom of the opening 2. These lugs have the extensions 14. The extensions are slidingly mounted in the sockets 15 in the side of the harp. Cotter pins 17 are passed through the sockets and the sides 16 for locking the bearing lugs in place. Springs 18 are arranged in the sockets back of the bearing lugs to crowd them forward into engagement. This engagement of the bearing lugs by reason of the beveled surfaces 13 assures a close fitting bearing for the trolley wheel at all times and takes up the wear, and at the same time makes such a connection with the trolley wheel as to assure the taking up of the current at all times.

The side of the hub 11 is preferably hinged to the harp body at 19. A screw 20 extends through the side 10 and into the lug 21 in the side 11 for securing the sides in position. A cotter pin 22 locks the screw in place.

In order to renew the bearing block or bearing lugs, all that is necessary is to remove the cotter pins 22, screw 20 and throw back the side 11. The bearing block is then removable from the socket 8 in the side 10 and the bearing lugs may be removed by removing the cotter pins 17. In this way the bearing parts may be quickly renewed when desired.

What I claim as new is:

1. In a trolley, the combination of a trolley wheel having a central opening therein; a bearing block arranged at the top of the opening supporting the wheel; and a bearing lug of conducting material engaging the wheel and acting as a brush for taking the current from the wheel at a part of the opening opposite the bearing block.

2. In a trolley, the combination of a trolley wheel having a central opening therein; a bearing block arranged at the top of the opening supporting the wheel, said block having a cavity opening toward the wheel for a lubricant; and a bearing lug of conducting material engaging the wheel and acting as a brush for taking the current from the wheel at a part of the opening opposite the bearing block.

3. In a trolley, the combination of a trolley wheel having a central opening therein; a bearing block arranged at the top of the opening supporting the wheel, said block having a cavity opening toward the wheel for a lubricant; a felt in the cavity for carrying the lubricant; and a bearing lug of conducting material engaging the wheel and acting as a brush for taking the current from the wheel at a part of the opening opposite the bearing block.

4. In a trolley, the combination of a trolley wheel having a central opening therein; a bearing block arranged at the top of the opening supporting the wheel, said bearing block having a cavity opening toward the wheel with supporting partitions extending across the cavity; and a bearing lug of conducting material engaging the wheel and acting as a brush for taking the current from the wheel at a part of the opening opposite the bearing block.

5. In a trolley, the combination of a trolley wheel having a central opening therein; a bearing block arranged at the top of the opening supporting the wheel; and a yielding bearing lug of conducting material engaging the wheel and acting as a brush for taking the current from the wheel at a part of the opening opposite the bearing block.

6. In a trolley, the combination of a trolley wheel having a central opening therein; a bearing block arranged at the top of the opening supporting the wheel; and bearing lugs of conducting material at each side of the wheel and engaging the wheel and acting as a brush for taking the current from the wheel at a part of the opening opposite the bearing block.

7. In a trolley, the combination of a trolley wheel having a central opening therein with tapering sides; a bearing block arranged at the top of the opening and supporting the wheel; bearing lugs of conducting material engaging the wheel and acting as a brush for taking the current from the wheel at a part of the wheel opposite the bearing block, said lugs having bearing surfaces engaging the tapered surfaces of the wheel at the opening, one of said lugs being yielding; and a spring for forcing the yielding lug into engagement with the wheel.

8. In a trolley, the combination of a trolley wheel having a central opening therein with tapering sides; a bearing block arranged at the top of the opening and supporting the wheel; bearing lugs of conducting material engaging the wheel and acting as a brush for taking the current from the wheel at the part of the wheel opposite the bearing block, said lugs having bearing surfaces engaging the tapered surfaces of the wheel at the opening, both of said lugs being yielding; and springs forcing said lugs into engagement with the wheel.

9. In a trolley, the combination of a trolley wheel having a central opening therein; a bearing block arranged at the top of the opening and supporting the wheel; a bearing lug of conducting material engaging the wheel and acting as a brush for taking the current from the wheel at a part of the opening opposite the bearing block; a harp; and a lug and socket connection between the bearing block and the harp.

10. In a trolley, the combination of a trolley wheel having a central opening therein; a bearing block arranged at the top of the opening and supporting the wheel; a bearing lug of conducting material engaging the wheel and acting as a brush for taking the current from the wheel at a part of the opening opposite the bearing block; a harp; a lug and socket connection between the bearing block and the harp; and a hinge for one side of the harp.

11. In a trolley, the combination of a trolley wheel having a central opening therein; a bearing block arranged at the top of the opening and supporting the wheel; a harp supporting the bearing block, said harp having a socket therein toward the bottom of the opening; and a bearing lug of conducting material slidingly mounted in the socket and engaging the trolley wheel and acting as a brush for taking the current from the wheel at a part of the opening opposite the bearing block.

12. In a trolley, the combination of a trolley wheel having a central opening therein; a bearing block at the top of the opening and supporting the wheel; a harp supporting the bearing block; a socket in the harp opposite the bottom of the opening; a bearing lug of conducting material slidingly mounted in the socket, said lug having a slot and acting as a brush for taking the current from the wheel; a pin extending through the walls of the socket and the slot; and a spring in the socket forcing the lug into engagement with the wheel.

13. In a trolley, the combination of a trolley wheel having a central opening therein; a bearing block at the top of the opening and supporting the wheel; a harp supporting the bearing block; sockets in the harp opposite the bottom of the opening; bearing lugs of conducting material slidingly mounted in the sockets, said lugs having slots and acting as a brush for taking the current from the wheel; pins extending through the walls of the sockets and the slots; and springs in the sockets forcing the lugs into engagement with the wheel.

In testimony whereof I have hereunto set my hand in the presence of two subscribing witnesses.

JOHN RISBRIDGER.

Witnesses:
H. E. NORRIS,
K. H. SHEARER.

Copies of this patent may be obtained for five cents each, by addressing the "Commissioner of Patents, Washington, D. C."